US007699697B2

(12) United States Patent
Darrah et al.

(10) Patent No.: US 7,699,697 B2
(45) Date of Patent: Apr. 20, 2010

(54) BONUS GAME SIMULATING AUCTIONS

(75) Inventors: Harlan J. Darrah, Sparks, NV (US); Jeff Mincey, Reno, NV (US); Jason Deen, Las Vegas, NV (US); Nick Greenwood, Reno, NV (US); DePalma Michael, Reno, NV (US)

(73) Assignee: Bally Gaming, Inc., Las Vegas, NV (US)

(*) Notice: Subject to any disclaimer, the term of this patent is extended or adjusted under 35 U.S.C. 154(b) by 290 days.

(21) Appl. No.: 11/745,286

(22) Filed: May 7, 2007

(65) Prior Publication Data

US 2007/0207850 A1 Sep. 6, 2007

Related U.S. Application Data

(63) Continuation of application No. 10/794,388, filed on Mar. 5, 2004, now abandoned.

(51) Int. Cl.

| | |
|---|---|
| ***A63F 9/24*** | (2006.01) |
| ***A63F 13/00*** | (2006.01) |
| ***A63F 13/10*** | (2006.01) |
| ***A63F 13/12*** | (2006.01) |

(52) U.S. Cl. ............................ 463/16; 463/29; 463/40; 463/42

(58) Field of Classification Search .................. 463/16, 463/25

See application file for complete search history.

(56) References Cited

U.S. PATENT DOCUMENTS

| | | | | |
|---|---|---|---|---|
| 6,146,273 | A * | 11/2000 | Olsen | 463/27 |
| 6,168,521 | B1 * | 1/2001 | Luciano et al. | 463/18 |
| 6,217,448 | B1 * | 4/2001 | Olsen | 463/25 |
| 6,254,483 | B1 * | 7/2001 | Acres | 463/26 |
| 6,358,147 | B1 * | 3/2002 | Jaffe et al. | 463/20 |
| 6,800,026 | B2 * | 10/2004 | Cannon | 463/16 |
| 7,037,195 | B2 * | 5/2006 | Schneider et al. | 463/25 |
| 7,112,134 | B1 * | 9/2006 | Erlichman | 463/16 |
| 2002/0160826 | A1 * | 10/2002 | Gomez et al. | 463/16 |
| 2003/0060276 | A1 * | 3/2003 | Walker et al. | 463/25 |

* cited by examiner

*Primary Examiner*—Victor Cheung
*Assistant Examiner*—Omkar Deodhar
(74) *Attorney, Agent, or Firm*—Andrew B. Chen; Adam C. Ellsworth; Marvin A. Hein

(57) ABSTRACT

A simulated auction bonusing game and method usable with games of chance, where one player terminal triggers a bonus round and is deemed a "seller" in the simulated auction, and all other active player terminals in a bank also participate as simulated "buyers." The "seller" makes choices of items to sell which are communicated to the "buyers." The "seller" watches are simulated bids are placed on their items, and "buyers" participate in simulated bidding of items shown on their screens. All the machines are synchronized so that the simulated auction bonus rounds play simultaneously. The seller and all buyers are awarded some winnings, enabling all player's terminals that run the simultaneous simulated auction bonus round to win each time the simulated auction bonus game is invoked.

13 Claims, 6 Drawing Sheets

Gaming Machine

Pseudo-Auction Bonus Game Infrastructure

Pseudo-Auction Game Play In Accordance With The Present Invention

Bonus Play Sequence For Pseudo-Auction Initiator Or "Seller"

Bonus Play Sequence For Pseudo-Auction Non-Initiator Or "Buyer"

Bonus Play Sequence When Triggered By Non-Game Event

BONUS GAME SIMULATING AUCTIONS

RELATED APPLICATIONS

This application claims priority from U.S. Provisional 60/452,912 filed on 7 Mar. 2003.

BACKGROUND

1. Field of the Invention

This invention pertains generally to gaming machines. More particularly, the present invention discloses a method and apparatus for providing gaming machines with a bonus game that simulates an auction either alone or between synchronized games.

2. The Prior Art

It is known in gaming devices to provide a bonus display in addition to the main game. The main game will typically have a video display of reels or other popular game of chance such as poker. During play of the main game, game events occur which trigger a bonus game. The bonus game then shows the player a visual display coupled with an award amount (an amount won). Bonus games are usually limited to the game machine on which the bonus triggering event occurred.

Although such games have achieved a certain popularity and success, there is a need for bonus rounds that provide for more player involvement.

SUMMARY

The present invention is a simulated auction bonusing game and method usable with games of chance. The bonus game may be triggered by an event in the primary game or, in the event the bonus game is not played in a selected amount time, invoked by the player terminal independently of the primary game.

When the simulated auction bonus game is triggered by an event in the primary game, that terminal plays the role of "seller" in the simulated auction. Other terminals banked with the seller terminal are queried to see if they are being actively played. All active terminals will participate in the upcoming simulated auction, and will play the role of auction "buyers."

The seller terminal starts its version of the simulated auction bonus round by presenting items that could be auctioned to the player. The player chooses a subset of the items on display (in one embodiment, 3 out of 6). If the player does not make a choice, the terminal will choose the subset of items. The chosen items are then shown on another screen, which also includes an animated character that acts in a manner reminiscent of an auctioneer.

The seller terminal then sends the image data to the buyer terminals (note: if there are no buyer terminals, the game still plays the same on the seller terminal). The buyer terminals use the data to show at least one of the provided images in the buyer's screen when the buyer bonus round begins.

The seller terminal then communicates its readiness to begin its bonus round to the buyer terminals. The buyer terminals respond. All the terminal are now "synched," meaning they will start their bonus rounds at approximately the same time. The idea is to have significant overlap in the playing times of each terminal, creating the visual illusion to players the bonus games may actually be involved in the same auction. It is not necessary that all the bonus games begin at exactly the same time; there could be seconds or even a minute or more difference between the starting times of the bonus games on different terminals. The design goal is to keep the starting times of the simulated bidding portions of the bonus games as close as possible to insure that the bidding portions of the bonus games are running simultaneously for at least a portion of the game. Generally, this should be achievable within a few seconds.

The seller terminal will display the items being auctioned, animate the auctioneer character, and will add points to counters that are visually associated with each item. The counters going up are simulating buyers bidding up an item. This continues for the specified amount of time, then the "auction" ends. The counters stop. In one embodiment, the counters are game credits and the total amount bid for each item is added up, shown to the player, and added to the game credit meter.

The amount a player wins is determined at the start of the simulated auction bonus round. The game software increments the counters in a manner such that they total up to the predetermined amount over the time the "auction" is in play.

The buyer terminals show a different display, currently comprising a set of items on which a player may "bid." The player picks three items, and is then providing with a screen having a button (touchscreen) and a counter associated with each item. The player may press the button to up their "bid" on any item (the counter associated with the item goes up). The counters do not correspond to anything; the numbers are in arbitrary units. The screen periodically labels an item as "High Bidder" to show the buyer/player is currently "winning" the item, or "Outbid" if the player is not currently deemed the high bidder. This continues until time runs out. The items the player "won" while bidding are identified and then some number of credits associated with each item is displayed. Those credits are then added to the game credit meter.

As with the player terminal, the buyer terminal will play automatically if the player does not respond (times out). The amount a player has won is determined at the start of the bonus round. The bonus game software adds numerical counts to the counters in a manner suggestive of bidding, and in response to the player touching a button. The software selects which items the player will win or lose, adding to the counters as needed to make it happen. The images of the items won are then faded to reveal the game credits each is worth, which add up to the amount determined at the start of the bonus round.

Important aspects of the simulated auction bonus game include a sellers and a buyers game, which play slightly differently to suit the roles in the simulated auction. Both determine the bonus win and use simulated auction screens with player involvement in the bonus rounds. The seller's game currently includes an animated auctioneer to help the auction theme. The seller/player picks items to auction off, those items are communicated to active terminals who then use one or more of the selected items on their screens. The shared items help support the simulated auction theme, showing interactions between terminals. The sellers terminal, starting the bonus round, goes through item selection and then coordinates with the active terminals in the bank (or other logical group) so that the sellers terminal, when simulating the auctioning of the items on its screen, is running at the same time as the simulated auction is running on the buyers terminals. This creates group sharing of bonus rounds, group interactions, apparent group play, and a realistic simulated auction bonus game.

Coupled with the unique shared auction bonus game of the present invention is a unique funding method for shared bonus games which uses locally managed and located pools, further including the use of a single seed for the pool at game initialization but requiring no other seeds as the pool is used to distribute winnings, and the ability to use self-leveling amongst local pools if the need arises.

DETAILED DESCRIPTION

Figure 1:
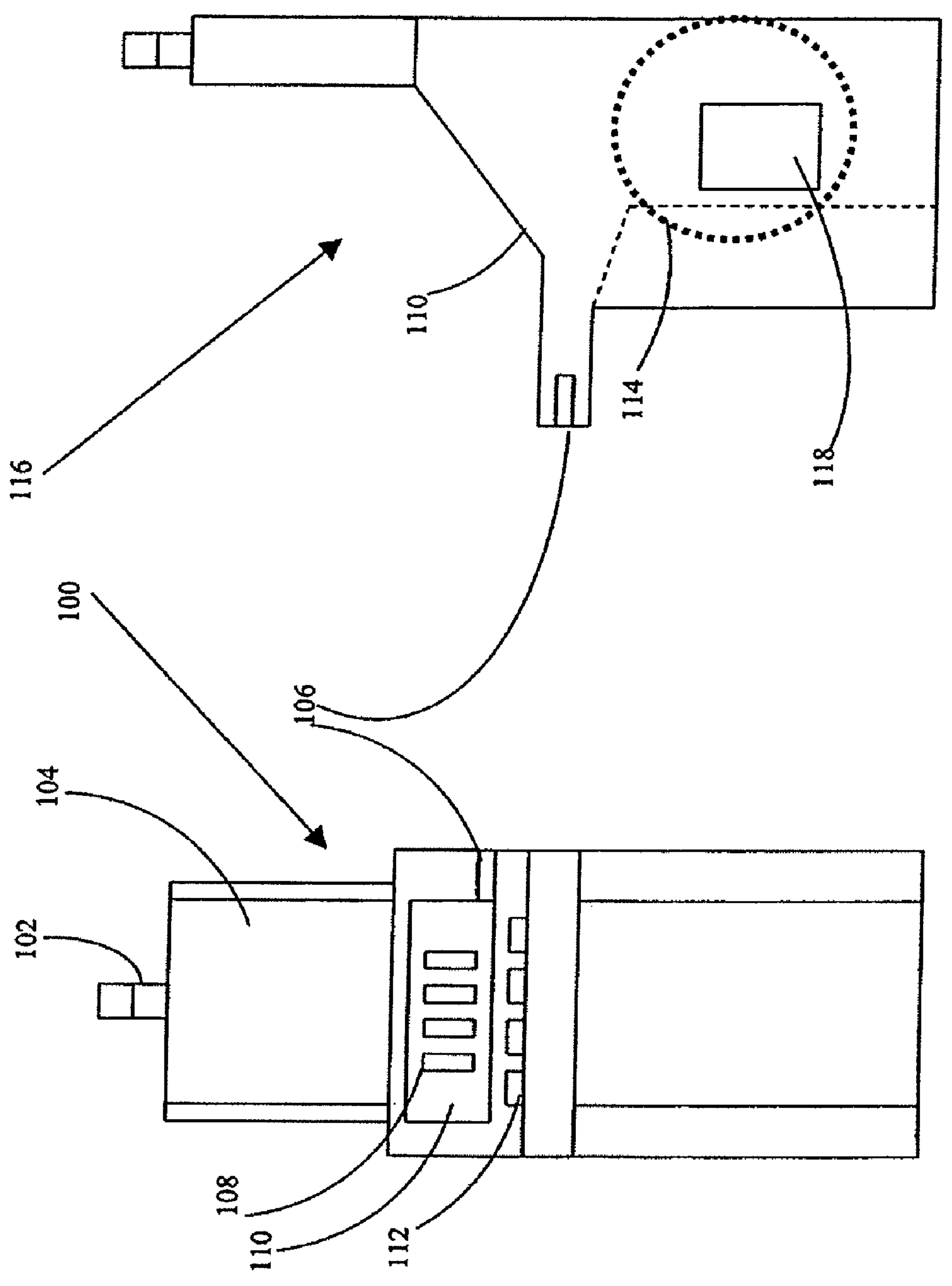
FIG. 1 is a block diagram of a player terminal (PT) in accordance with the present invention.

Persons of ordinary skill in the art and with the benefit of the present disclosure will realize that the following description of the present invention is illustrative only, and is not limiting. Other embodiments of the invention will readily suggest themselves to such skilled persons who also have the benefit of the present disclosure.

Referring to the drawings, for illustrative purposes the present invention is shown embodied in FIGS. 1 through 6. It will be appreciated that the described apparatus may vary as to configuration and as to details of the parts without departing from the inventive concepts disclosed herein. The described and illustrated methods may vary, without limitation, as to details, partitioning, repetition, step inclusion, and the order of acts, without departing from the inventive concepts disclosed herein.

U.S. Provisional application 60/452,912 is hereby incorporated in its entirety by explicit reference in the present application.

FIG. 1 shows one general style of player terminal (PT, also called a gaming machine or slot machine) called a slant-top. There are other styles of PTs, with another popular style being the upright (not illustrated). Shown is a front view 100 and a side view 116. Candle 102 lights when there is a machine fault, which typically includes such events as running out of tokens or coins to pay a cash-out or a monetary prize over a certain amount. Area 104 is typically art for the game, and is usually passive. There is a monetary input slot 106, typically a bill acceptor. Monetary input slot 106 may also be, or include, a coin acceptor. Coin acceptors are typically found on older machines or machines having lower-end betting amounts ("penny," "nickel," or "quarter" slots). Input slot 106 may also be a voucher or ticket acceptor coupled with a ticket or voucher printer. Slot area 110 typically comprises a glass cover having opaque art applied, with windows or a viewing area 108 through which a player views a video screen. Alternately, slot area 110 and slot windows 108 may together be a video screen, showing simulated reels and reel spins, poker games, or any other primary game whose outcome is based primarily on chance. Finally there are a set of player input devices, typically simple buttons, shown as buttons 114. Side view 116 shows the slanted portion of the machine (thus the general name "slant top"), which has the game viewing area 110 and monetary input device(s) 106.

Gaming machine 100 has, in its interior, a main processor board 118 whose location is generally indicated as 114 (the actual processor board and mounting hardware are on the inside of the cabinet).

Processor board 118, in addition to have physical mounts such as guides, rails, standoff mounts, board slots, board slides, or board tray, will further have cabinet electronic interfaces, typically at the back of the board (towards the front of the cabinet, from a player's perspective). Processor boards will typically have a set of multi-pin plugs or bus connectors that slide into mating plugs or bus connectors when the processor board is correctly seated in its mounts, plus additional electronic or optical interfaces, to enable operable connections with the other electronic components of the PT. The processor board includes a programmable CPU, memory, and other chips needed to support an embedded OS such as a UNIX-based OS, embedded Microsoft NT®, or other embedded OS of the game developer's choice, plus additional programming to carry out, in addition to other functions, primary game play and the bonus game play of the present invention. Note that any PT architecture is equally usable with the present invention as long as there is programmable logic, some type of program storage, communications capability to at least one of: other PTs; a game controller; or, a central computer (server), and at least one programmable display sufficient to enable the bonus game to operate when run in the PT.

Figure 2:
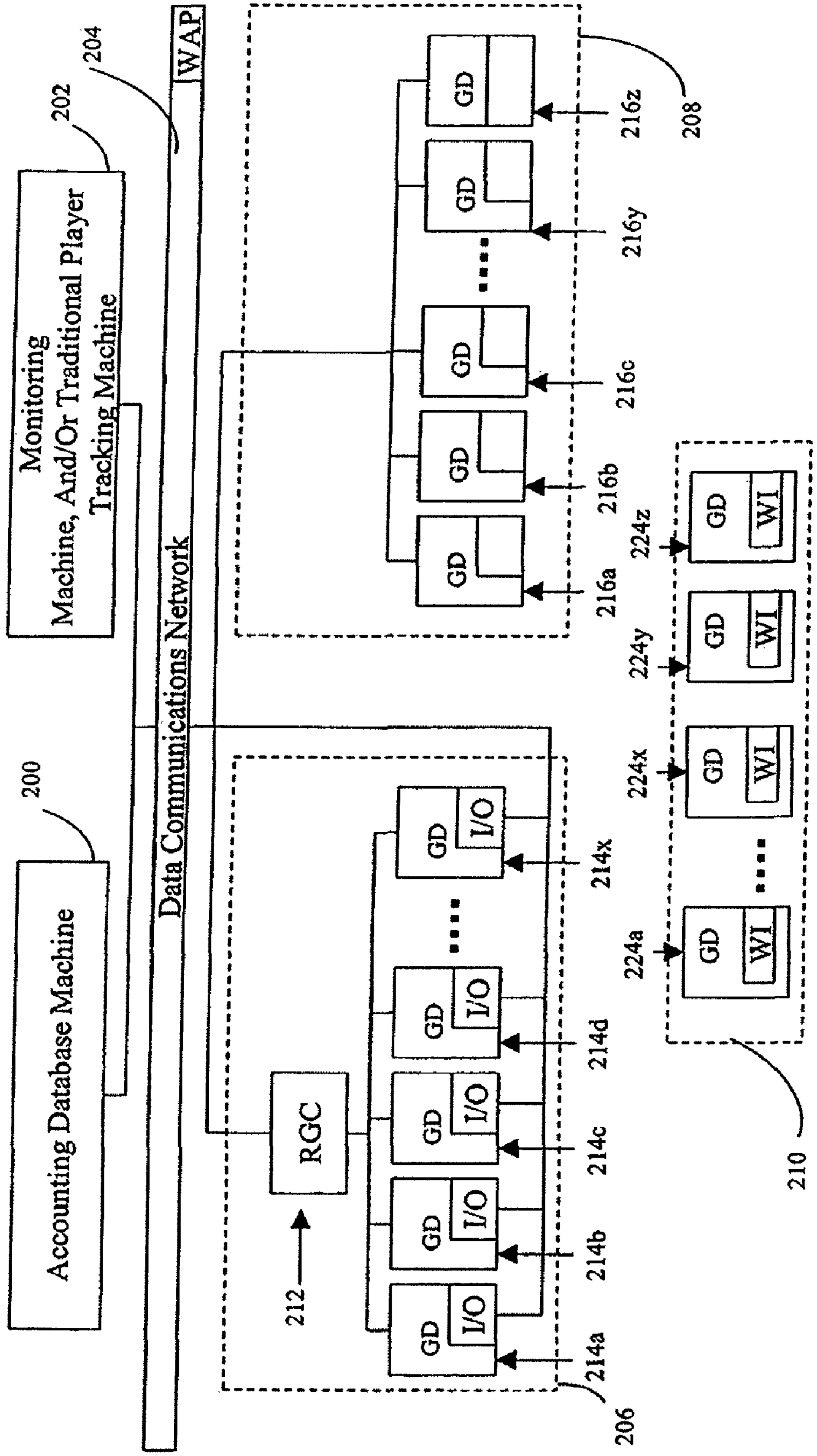
FIG. 2 is an architectural overview diagram of a gaming system in accordance with the present invention.

Examples of how PTs may be systemically connected in a manner usable with the present invention is shown in FIG. 2. Subsystems 206 and 208 are each operatively coupled for communication to a player tracking machine 202 via a data communications network 204. Subsystem 206 comprises a plurality of game devices coupled to a remote game controller (RGC) 212. RGC 212 is coupled to communication network 204 for communication with backend machines 200 and 202, as well as any other machines that can be addressed directly on the communications network. Subsystem 206 includes individual game devices or PTs 214*a*-214*x*, where there can be any number of individual gaming devices between 214*d* and 214*x*. If there are too many PTs for one RGC to support, then there will be more RGCs, where each bank of PTs will connect to one RGC.

Subsystem 206 also shows that each game device 214*n* has a box labeled as "I/O" standing for "Input/Output", where the box comprises a networking interface usable by the bonus game programming operably installed in each PT. This illustrates that it would be possible to retrofit existing games with the bonus game of the present invention using additional circuitry to enable inter-PT communications (this is not expected to be the common implementation, but if demand is high enough is a possible implementation to make use of older, existing gaming machine cabinets).

Subsystem 208 is similar to subsystem 206, but shows an installation where the game devices 216*a*-216*x* do not use an RGC, connecting directly to backbone network 204 (in a preferred embodiment, using Ethernet). In this configuration, the functionality described as implemented in the RGC would instead be implemented (in software) within Monitoring Machine 202 or within an individual PT.

Subsystem 210, unlike subsystems 206 and 208, is not physically coupled to communication network 204. Each gaming device will be configured to include a Wireless Interface (WI), which will be in operable communication with a Wireless Access Point (WAP). This is expected to be a configuration of choice in future casinos. In other respects the system would work similarly to system 206 or 208. To work similarly to system 206, there would be a bank of RGCs in operable communication with network 204, each communicating with a bank of PTs through WAPs placed throughout the casino. Alternatively, RGCs would incorporate WAPs that would be able to communicate with a bank of PTs.

Subsystem 206 is expected to be the most common configuration until wireless connections become more accepted in the gaming industry.

The bonusing methods and apparatus of the present invention may make use of several types of progressive pools. First, there may be more than one level of pool (win level). One embodiment uses between 1 and 7, with the casino operator deciding how many to run (a settable parameter for the system). A typical example would be three, with each level corresponding to the number of bonus event trigger symbols appearing on a payline in a 5 reel primary game. If three bonus symbols appear on a payline, the lowest level (lowest award amount) of bonus round is invoked, using a pool for that level. If four bonus symbols appear on a payline, the middle level of bonus round is invoked, using a pool for the mid-level. If five bonus symbols on a payline (one on each reel), then the highest level of payout for a bonus round is invoked, using a pool for the that level. The currently preferred embodiment is to have the bonus game play the same way for each level; what changes is the amount players win.

There will be a pool per level at each place a pool is kept. The pools are typically funded by taking a percentage of the amounts wagered on the PTs, with the highest percentage of wager put into the highest award level, down to the lowest percentage of wagered amounts being put into the lowest level pool. Other funding methods are entirely compatible with the present invention, including direct contributions from non-wager funds such as promotional funds.

The pools may be kept in several locations. One preferred embodiment, and the embodiment expected to be most popular, is that each PT will keep track of its pools (one pool for each level). Pools kept on each machine are called local pools. When a bonus game is played, the local pools are the pools used to payout the bonus game winnings (there are usually a plurality of PTs involved in each bonus round). However, pools may be kept on the RGC to which the PT is in communication, where pools will be kept on a per PT basis (PT-specific pools). There may also be a common pool in addition to local or PT-specific pools, where some of the winning will be drawn from the common pool. Finally, it is possible to make use of common pools only, where the bonus game winnings of the present invention are paid out using some portion of the common pool. Local pools can reside on the PT, or be kept on a per-PT basis on RGCs or another backend computer system. Common pools cannot reside on individual PTs; common pools may be kept on a per-bank basis on RGCs, a linked progressive machine, or for any desired grouping of PTs on a general purpose backend computer system (server).

An important aspect of the present invention is that when a bonus round is triggered, multiple PTs may participate in the pseudo-auction or simulated auction bonus round. To enable this, there must be some form of inter-PT communications. One preferred embodiment, usable with a configuration such as subsystem 206 or 210 of FIG. 2, has the PTs in a bank communicate through a common RGC (for subsystem 210, the RGCs may be connected to network 204 or may be configured to be the WAPs). The RGC is configured such that when a certain message type or category of message is received from a PT, that message is forwarded to either all the PTs connected to the same RGC, including the message sender, or just to the non-sending PTs connected to the same RGC. Responses to the message are sent by the receiving PTs back to the RGC, which then relays or otherwise communicates the substance of the message with the PT that sent the original message.

If the system is configured similarly to subsystem 208 in FIG. 2, then the PTs may communicate directly with each over their common Ethernet connection, or may be configured to communicate with a backend system which then relays messages to other PTs.

As will be clear to a software protocol engineer having the benefit of the present disclosure, there are numerous communications solutions for each system configuration that will functionally enable the relatively low bandwidth inter-PT communications needed for the present invention.

Figure 3:
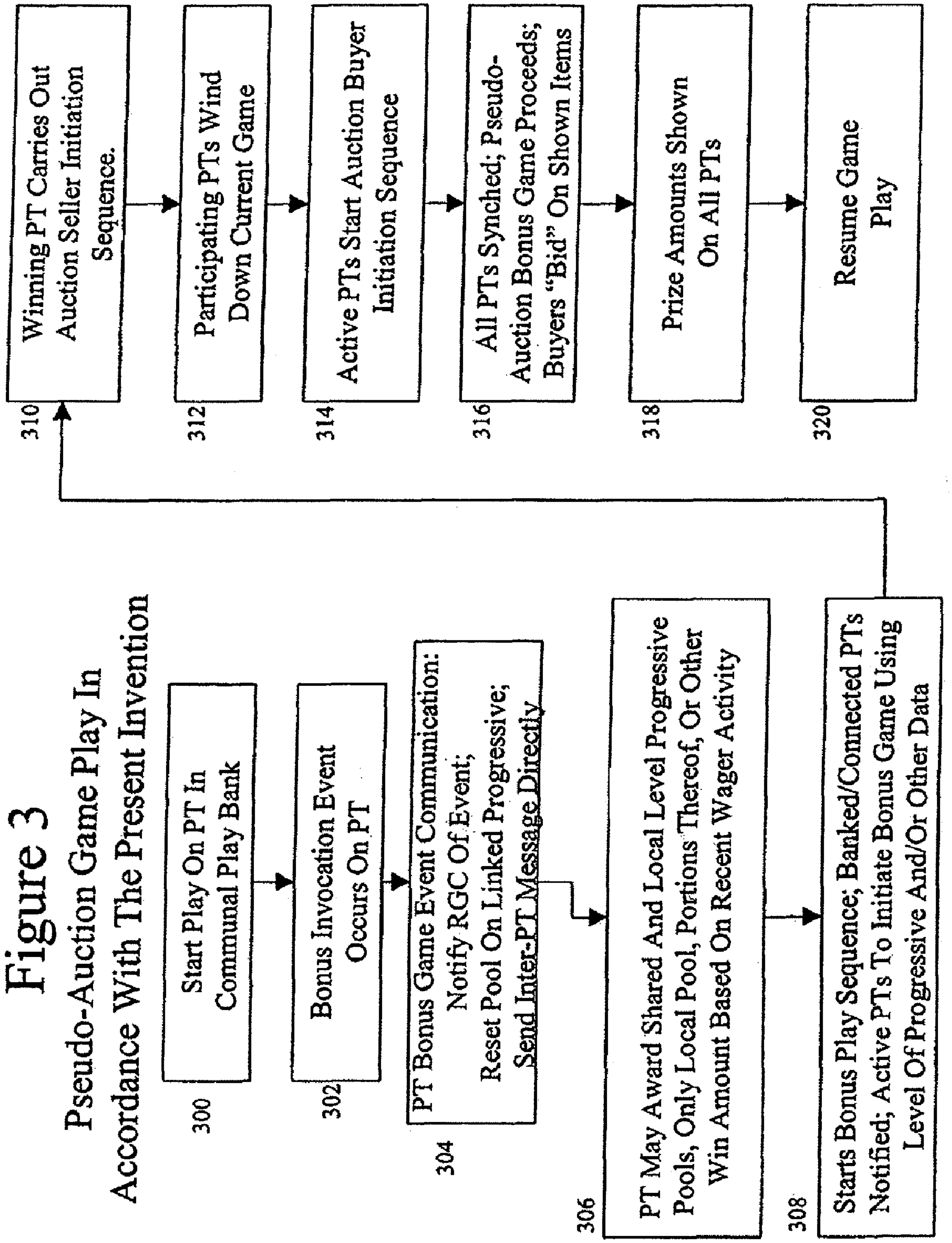
FIG. 3 is a flow diagram of a pseudo-auction game according to the present invention machine.

Referring to FIG. 3, the actions corresponding to box 300 are those associated with a player picking to play a game at a PT which has the bonusing game of the present invention thereon. Continuing into box 302, the player commences play at a PT until a bonus triggering game event occurs. After the occurrence of the triggering event, box 302 is left for box 304.

The actions corresponding to box 304 are those needed for the PT to communicate the bonus trigger event to other PTs, with the most common configuration being through the RGC and/or progressive controller. One preferred embodiment will send a specific message to the RGC to which the PT is connected, after which the RGC sends messages to all the PTs connected to the RGC inquiring about their eligibility for a bonus round. Another preferred embodiment has the winning PT send a request for a payment amount to a linked progressive controller; this resets the applicable pool level. All the PTs connected to this linked progressive controller run polling loops that detect a reset, letting each PT detect when a bonus round event has occurred on another PT. Upon detecting this event through use of a polling loop or receiving a message from the RGC requesting its eligibility to participate in a bonus game, each PT will send its bonus game eligibility to the linked progressive controller or RGC which relays the information to the PT on which the bonus game trigger event occurred. Other communications methods will work as well; for example, if the system is configured similarly to subsystem 208 of FIG. 2, then the PTs may be configured to communicate directly with each other over their Ethernet connections when a bonus game trigger event occurs an a PT.

Continuing into box 306, there are a plurality of ways to use pools for the bonus game about to be played. One is to make use of local pools only, where the player wins what is in the local pool for the appropriate win level (or a percentage of the local pool, or other method to keep the pool from being reset to 0 at each win event). Another is to use both common and local pools, where the PT that triggers the bonus round awards a player both the local pool and an certain amount from a common pool, while the other participating PTs use only money from local pools. Another is to use common pools only, where each participating PT is awarded a percentage of the common pool.

A currently preferred embodiment is to use local pools only. In using local pools, a unique pool management method is used. Unlike methods currently in use for managing pools, the local pools of the present invention only require the use of a single seed when the pools are first initialized. After that, the pools are kept from reaching 0 value (and thereby requiring another seed) by awarding percentages of the pool amount upon invocation of the bonus game. In one embodiment the percentage to be awarded is partially based on the amount a player has wagered in a pre-defined time preceding the bonus round, added to a standard percentage amount. This rewards active players over slow, low-spending players. The simulated multi-participant auction bonus game of the present invention is intended to be played at a relatively high rate as compared to previous bonus games, with a target of less than a 20 minute average between bonus rounds on a bank of at least 8 PTs. It is currently believed that the frequency of bonus game play is better supported using self-managed local pools, including no need for seeding except at initialization, than traditional methods.

Continuing to box 308, PTs in communication with the PT on which the bonus triggering event occurred determine their eligibility to participate in the upcoming bonus game. To participate in the upcoming bonus game of the present invention, a PT must be in active use by a player when the bonus game triggering event occurs on another PT. The determination of what constitutes a PT in active use can be heuristically determined using many indicators. Which are implemented may be determined by individual game developers as well as being settable parameters usable by the PTs' operators.

Determinants used to establish an active PT include but are not limited to coin-in (or wagered-amounts) during a specified period preceding the bonus notification (typically somewhere between a few minutes to ½ hour), the presence of a player's card, biometric feedback, and if the PT is currently in the middle of a primary game play itself. The PT, using the heuristics programmed into it, decides if a player was active at time the PT was notified a bonus round was triggered. Note: although not the preferred embodiment, the RGC and/or progressive controller could also be programmed to make a determination of what PTs are active at any given time. In that case, as soon as the backend system was notified that a bonus play was triggered, it would determined which connected PTs were active and which were not.

As soon as a determination is made as to each PTs active or inactive state (therefore their eligibility or non-eligibility for the bonus game), any player starting play at a PT determined to be inactive will not be included in the upcoming bonus round. Active PTs communicate their status with the PT on which the bonus game trigger event occurred. This is the set of PTs that will participate in the upcoming pseudo-auction bonus game. A design goal of the present invention is to involve other active players on connected PTs in the upcoming bonus round when there are any; however the bonus game of the present invention is fully enabled to play on the PT triggering the bonus game even if there are no other active players.

All active PTs will participate in the upcoming bonus round. Active PTs will receive information on the pending bonus round, including but not limited to what template or objects or subset of objects to include in its displayed items up for "bid" and the level (which payout pool to use) for this simulated auction bonus game round. In the currently preferred embodiment, the active PTs will use their local pools to fund the bonus rounds. As a result, heavily played PTs will have larger local pools than lightly played PTs. If player feedback in the field indicates that the different levels of local pools is perceived as an inequity and becomes a cause for complaints, then it is fully contemplated that an additional local pool funding management method called "pool self-leveling" will be implemented. Pool self-leveling is carried out amongst the PTs by communicating between themselves directly at periodic intervals (for example, every 15 or 30 minutes). A master PT, where the master PT could either rotate or be permanently assigned, carries out the task. The master PT totals the local pools and redistribute pool amounts between PTs so they are approximately equal (being exactly equal is not necessary).

Continuing into box 310, the PT that triggered the bonus game play starts what is called the seller portion of the auction bonus game. The initial seller sequence in the simulated auction bonus game comprises any sequence which results in a set of items to be "auctioned off" by the seller being made visible to the seller. In a preferred embodiment, the seller (which is always the PT which had the bonus round triggering event occur in the primary game, thereby triggering the bonus game play) is presented with a selection of items to "put up for auction". For example, the player may be shown a picture of a garage, attic, storage room, or "ghost view" of a house that has items in higher relief (any way of visually identifying the items may be used, such as color on a black-and-white background picture, all items in one color, some kind of ID badge next to the item such as a number, etc.). The player chooses 1 or more of the items in a specified amount of time. The number of items to chose will be decided by each game implementer. It is currently a preferred embodiment to have a seller pick 3 items out of 6, or 6 items out of 12. As more experience is gained with the game, it may be decided that a few more or a few less items should be chosen by the player, but the range is expected to remain roughly the same.

These items are then shown on the seller PT to the player in a pseudo-auction or simulated auction format. The basic idea is that seller picks the items they hope will yield the highest bids from other players (the other active banked PTs). Of course, the bonus amounts are actually determined by the amount in the progressive pools (linked and/or local). This process is fully automated; if a player does not choose any or enough items, the PT randomly selects which items will be "auctioned" after the expiration of a timed period.

The selected items are communicated to the rest of the participating PTs. As used in this disclosure, PTs that are participating in a simulated auction or pseudo-auction bonus game are those PTs that:

a. are in communication with the PT on which the bonus game triggering event occurred and where those PTs that are in communication form a group, and where that group will typically comprise one bank of PTs in a casino but is not limited to that embodiment (e.g., may be any group of PTs depending on the system and how it is configured for any given casino); and, b. are active when a bonus game triggering event occurs on a PT, where "active" is defined elsewhere in the present disclosure.

The precise form of the image communication is not being specified, as it may be anything usable by current or future game designers to encompass the needed data transfer for the present invention. For example, the image's descriptions may be communicated directly, or the RGC or progressive controller may incorporate the items into some kind of display template and the template communicated by reference, etc. Further, it is important to note that it is not required that all the items chosen by the "seller" will necessarily be displayed on all the "buyers" screens. A currently preferred embodiment will have one or more but not all of the set of items chosen by the seller appear on each of the participating PT's ("buyer's PT") screen. The rest of the items shown on the buyer's screens may be chosen in a random or other manner and communicated with to the participating PTs. In addition, the currently preferred embodiment always shows at least one item on a participating PTs screen that was not selected by the seller's PT (this is not a requirement for all embodiments).

Having items on the buyer's screens not originating from the seller's machine has several advantages. Benefits include having the visual appearance of "more choices"; choices not simply made by the seller (as if there was a broader selling audience); and, easily enabling the ability to award jackpots that may differ between participating PTs.

Continuing to box 312, participating PTs will begin the process of winding down any in-progress games. For the most part, this will simply entail finishing any primary game currently being played and then presenting a screen to the player notifying them that they are going to participate in an auction-themed bonus round. Participating PTs may either wait for a participation message from the PT where the bonus game invocation took place (although not currently a preferred embodiment, such a message could also originate from a linked progressive controller, RGC, or backend server), or may be programmed to put themselves into a sequence that will invoke an auction-themed bonus game upon the PT making its own determination that is active.

The auction bonus game software will take into account the timing differences between the occurrence of the bonus game trigger event in a primary game, the determination of the participating PTs, the start of the simulated auction game events on the triggering PT (player selecting items to be auctioned), the ending of any in-process primary games by participating PTs, communicating the items to be shown on the participating PTs as determined by the PT on which the trigger occurred, and the start of the simulated or pseudo-auction bonus game. The design goal is to start the simulated auctioning of the bonus rounds on the triggering PT and the participating PTs as closely as reasonably possible. Each PT actually runs its own bonus programming independently of the other PTs, once the objects to display have been communicated to the participating PTs and the PTs are in synch to start the bonus round. The PTs will run their bonus rounds reasonably simultaneously, giving the appearance to players that the simulated auction is a single event even though each PT actually executes its bonus programming independently once started.

As will be clear to a software protocol engineer having the benefit of the present disclosure, a sequence of coordination messages between the PTs including but not limited to: participating PTs informing the triggering PT they are ready to start an auction bonus round; messages from the triggering PT having the data (pointers, template indicators with field selections for certain objects, etc.) to enable the participating PTs to show certain selected images in the auction bonus round; and, synching messages to start the bonus game on all PTs, are implementable using a variety of protocol designs.

Moving to box 314, any final communications take place between the triggering PT and the participating PTs; specifically indicated in box 314 is the item selection (items to be "auctioned") actions on the seller's PT after which the player is presented with an auction game screen. The currently preferred embodiment has the participating (buyer's) PTs notify the player that they will be entering a bonus round shortly using a message-like text box near the top of the screen, but for the time being primary game play continues. Continuing into box 316, when the seller's PT enters its auction game screen (having finished object selection), there is a text message informing the player that other PTs are being enrolled in the bonus round. Simultaneously the PT sends messages to participating PTs it is time to start the bonus games. As each primary game ends on the participating PTs a screen is shown that informs the player they are "connecting" to a bonus round. As soon as the PTs are in synch, the auction bonus game begins. In a preferred embodiment, it is a selectable parameter if the participating PTs are to discontinue primary game play immediately upon satisfying their active state to participate in the upcoming bonus game or if primary game play continues until the seller's PT finishes its object selection.

In the currently preferred embodiment, the seller's screen is different than the buyer's screen. The seller's screen is the only screen that has a character or symbol that evokes the image of an auctioneer (currently a cartoon character that acts like an auctioneer at a podium), plus voice sounds that simulate an auctioneer auctioning items. The character acts like an auctioneer as the items on the seller's screen get credit amounts added to them, as if bidding is occurring. In fact, the amount to be won has already been established at the start of the bonus game, and the bonus game software allocates credits to items on the screen at calculated time intervals until the bonus game ends, totaling the predetermined amount. This gives the visual appearance of bidding activity on the seller's items (the images on the screen in front of the player).

The buyer's screen shows the items on which they are "bidding", which allows players to use the touchscreen to make bids on items of their choice. Unlike the sellers' screen, the buyer's screen has arbitrary bid amounts (not game credits) that show up on the screen under the illustrated items as time goes on. The player can touch the screen to "outbid" (add to the fictitious bid amount) other players who are apparently bidding against them. In fact, each PT runs its own game and the bidding is in appearance only. There is currently no auctioneer-style character on the buyer's screens, nor any of the auctioneer-style chatter. After the bonus game ends, whatever items the player "won" (actually determined by the PT) is then shown to the player and assigned a credit value. Like the seller's PT, the buyer's PT had already determined the amount to be won by the player at the start of the round. The bonus game action comprises showing the player a set of items on which amounts are bid, the amounts not corresponding to game credits. After the "bidding" stops, the PT, having made sure the player apparently wins at least one item, assigns game credit amounts to the "won" items equal in total to the amount already determined, and shows the total to the player.

Note that it is not a requirement of the simulated auction games to have the currently preferred screens if player preference emerges for a different set of screens. For example, if players prefer no auctioneer on the seller's PT, the screens can be so modified while staying within the inventive scope of the current disclosure.

For both the seller and the buyer of the simulated auction game, the bonus round will complete with or without player interactions. Players are provided interactive capabilities in each case, but there is a timer for each such activity and the bonus game software will take whatever action is needed to complete the bonus game if a player does not interact with the PT.

The showing of the game credits won on each of the participating PTs (including the PT that triggered the bonus round) corresponds to box 318. As soon as the game credits are shown on the screen and game credit meters updated, box 320 is entered. The actions corresponding to box 320 are the continuation of primary game play.

Figure 4:
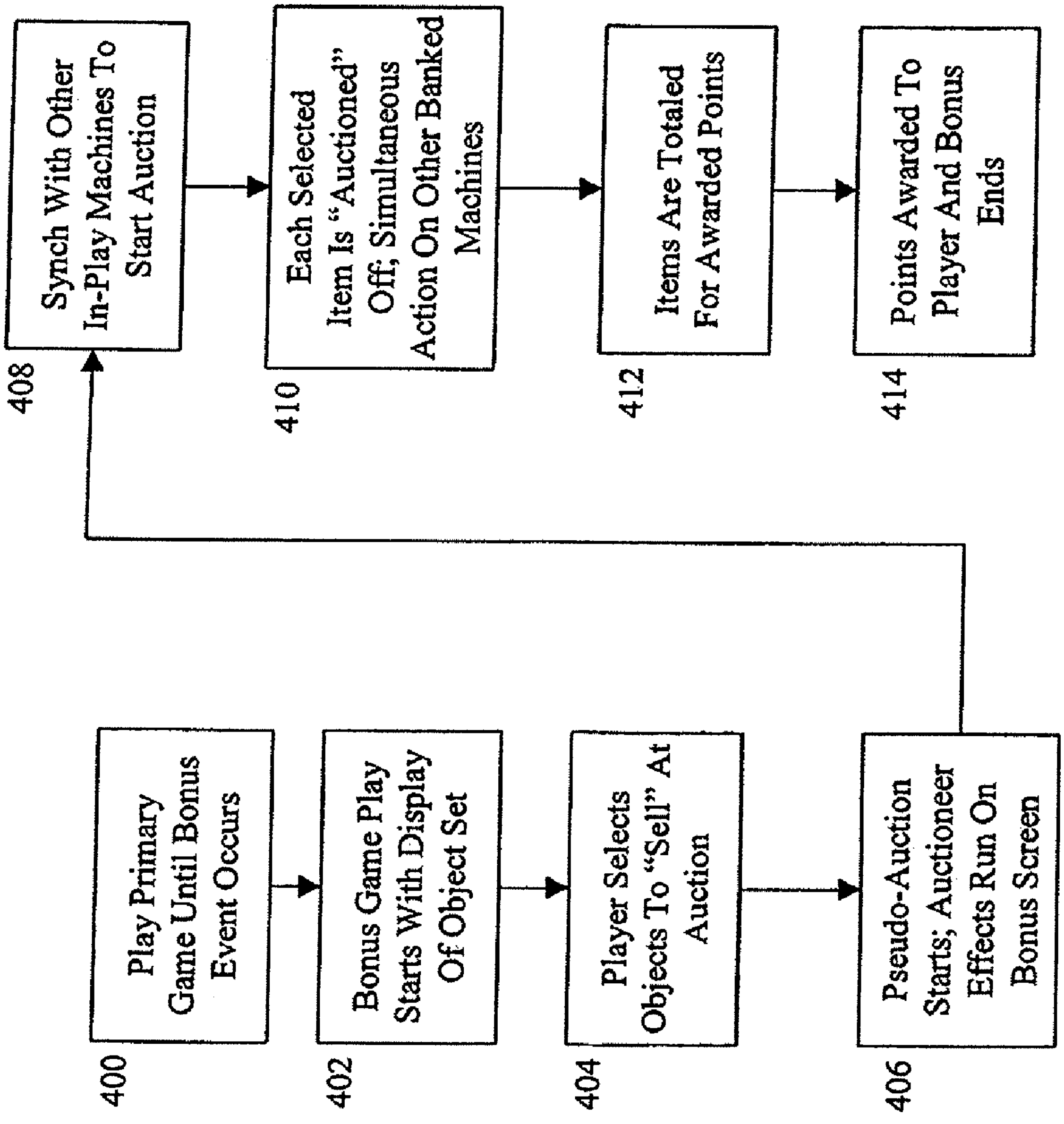
FIG. 4 is a flow diagram of a pseudo-auction game from a "sellers" perspective (the PT on which a bonus game triggering event occurs) according to the present invention machine.

FIG. 4 shows actions for the simulated auction bonus game from the perspective of the player on whose PT the bonus game trigger event occurs. Box 400 corresponds to the actions of playing a primary game on a PT that also has the bonus game of the present invention. In the currently preferred embodiment the primary game is a slot game which has reel symbols that, when occurring on a payline, will invoke the auction bonus game. However, the primary game may be any game based on chance. Continuing into box 402, the auction bonus game presents text and (where equipped) voice output that lets the player know they have invoked the auction bonus game. Then, the player is shown a set of objects from which they pick a subset, where those objects chosen will be "auctioned off". Any visual and auditory method may be used to enable the selecting of objects; the currently preferred embodiment uses a touchscreen where the player touches the objects to be "auctioned". If a player does nothing, the PT will select a subset of objects to show in the auction round of the auction bonus game. In the presently preferred embodiment, a visual timer and accompanying voice suggestions let the player know to make a selection or the PT will automatically make one for them. Objects are now determined for the next stage of the auction bonus game.

Continuing into box 406, the player is shown an auctioneer and the objects to be auctioned. The auctioneer is animated to make auction-like movements with its hands and facial expressions, and voice-overs are provided that sound like items are being bid on at an auction. The first action is to show a visual indication that this game is synching up with other games to run the auction, coupled with associated noises and voice-overs. The "bidding" then starts, where the animated auctioneer makes auction-like movements and sounds while simultaneously the game credit boxes visually associated with each item show gradually increasing numbers. This continues for a specified amount of time to provide player entertainment and involvement.

Continuing into box 412, the auction stops and the items are considered "sold" for the number of game credits shown under each item. The game credits are totaled and shown to the player as an over-all wining amount (the number of game credits won). Finishing in box 414, the totaled credits are added to the credit meter of the PT.

Significant changes can be made to the embodiment described above while staying within the inventive concept of the shared auction bonus game of the present invention. By way of example and not limitation, the amounts shown under each item need not be game credits (may be an arbitrary unit later assigned to game credits); there may be no animated figure; additional player interactions while items are "up for bid" may be added such as allowing the player to withdraw an item (the auction bonus software could simply add the removed credits to another item, as if a bid had been made); the item selection portion of the game may be lengthened or eliminated; etc.

Figure 5:
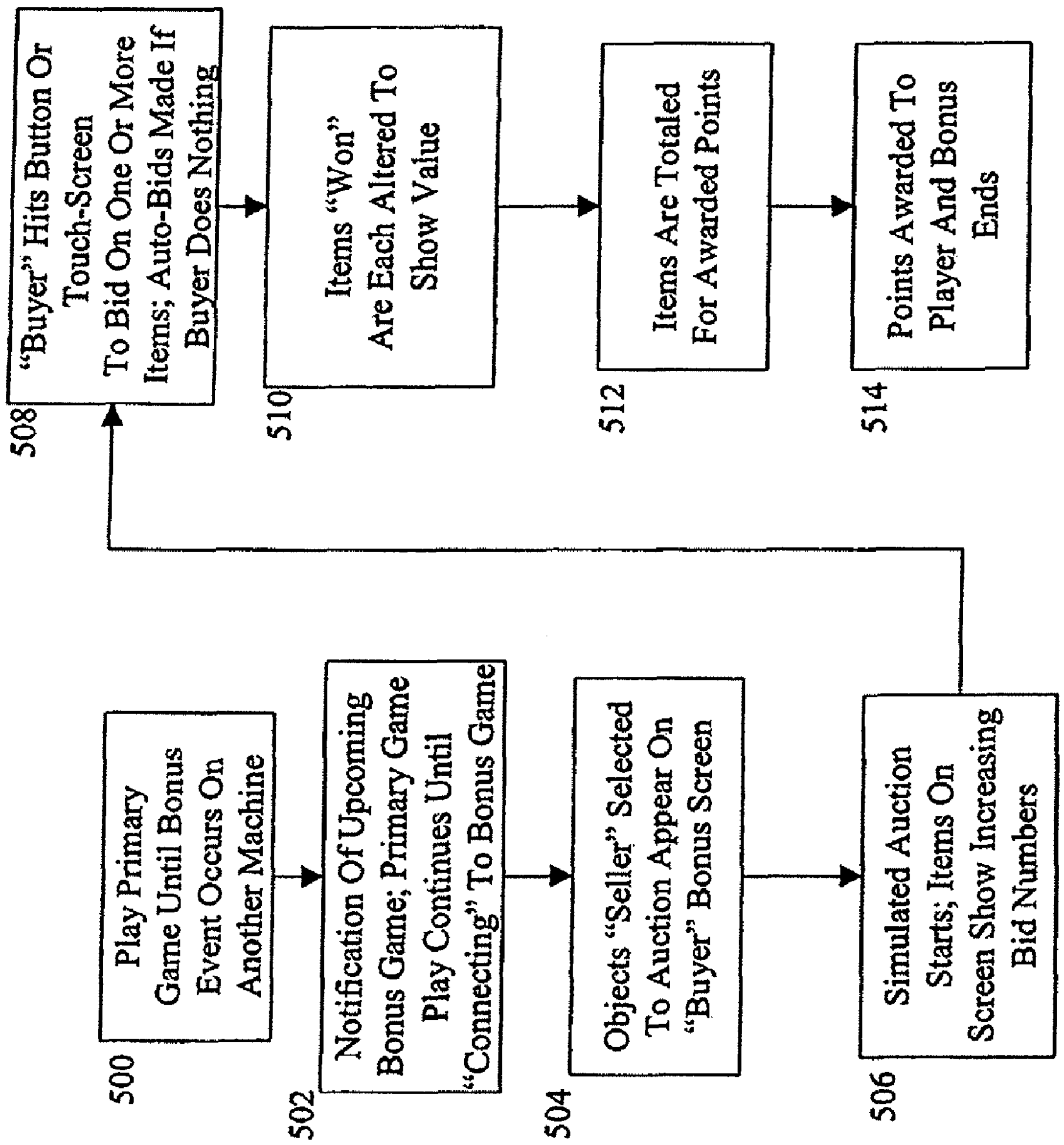
FIG. 5 is a flow diagram of a pseudo-auction game from a "buyers" perspective (a PT eligible to participate in the bonus round that is not the PT on which the triggering event occurred) according to the present invention machine.

FIG. 5 illustrates game play from a participating PT (a PT that will participate in the bonus round but did not trigger the bonus round). Box 500 corresponds to a player playing a primary game at a PT that also has the auction bonus game of the present invention thereon. Continuing into box 502, the PT displays a message that this PT will soon be playing in a bonus round triggered by another PT. Primary game play continues while the screen shows a message about the upcoming bonus round. Some number of seconds or minutes later, the primary game play ends (at the end of an individual game play), and there is text and sound that is intended to be evocative of a computer going "on-line" through a modem and "connecting" to the auction bonus round. A message then appears that says the connection is made, and actions continue into box 504.

At this time, a screen appears that has a selection of items on which the player may "bid". The player touches the touchscreen to select a subset of the items shown on which they can bid. If the player does nothing, the PT will make the selection. The selected items are then shown in a larger format, and there is a counter visually associated with each selected item.

Continuing into box 506, the counters start increasing to simulate bidding. The images reflect who is winning using a text box and/or highlighting, where the message says "High Bidder" or "Outbid" or similar words to indicate the same concepts. Box 508 corresponds to actions that can be taken by a player, where there is a button provided for each item which a player can touch and thereby increase their bid for that item. The counters do not reflect game credits; the numbers are arbitrary. With or without player input, the counters associated with each item increase. If the player does nothing, the PT will "bid" for them, always making sure at least one item is "won" by the player.

The actions corresponding to box 510 include stopping the bidding and indicating to the player which items have been won. There will always be at least one; in the preferred embodiment there will also always be at least one item the player "lost" or was "outbid on", to help preserve the simulated auction game play theme. The wining items are then faded, revealing the game credits each won item was worth. These game credit amounts are set by the PT to be equal to the amount to be won by the player at the start of the auction bonus game; this is not known to the player.

Continuing into box 512, the game credits associated with each won item are shown on the screen and also shown as a total for the player. Moving into box 514, the total is added to the game credit meter and game play returns to the primary game.

Figure 6:
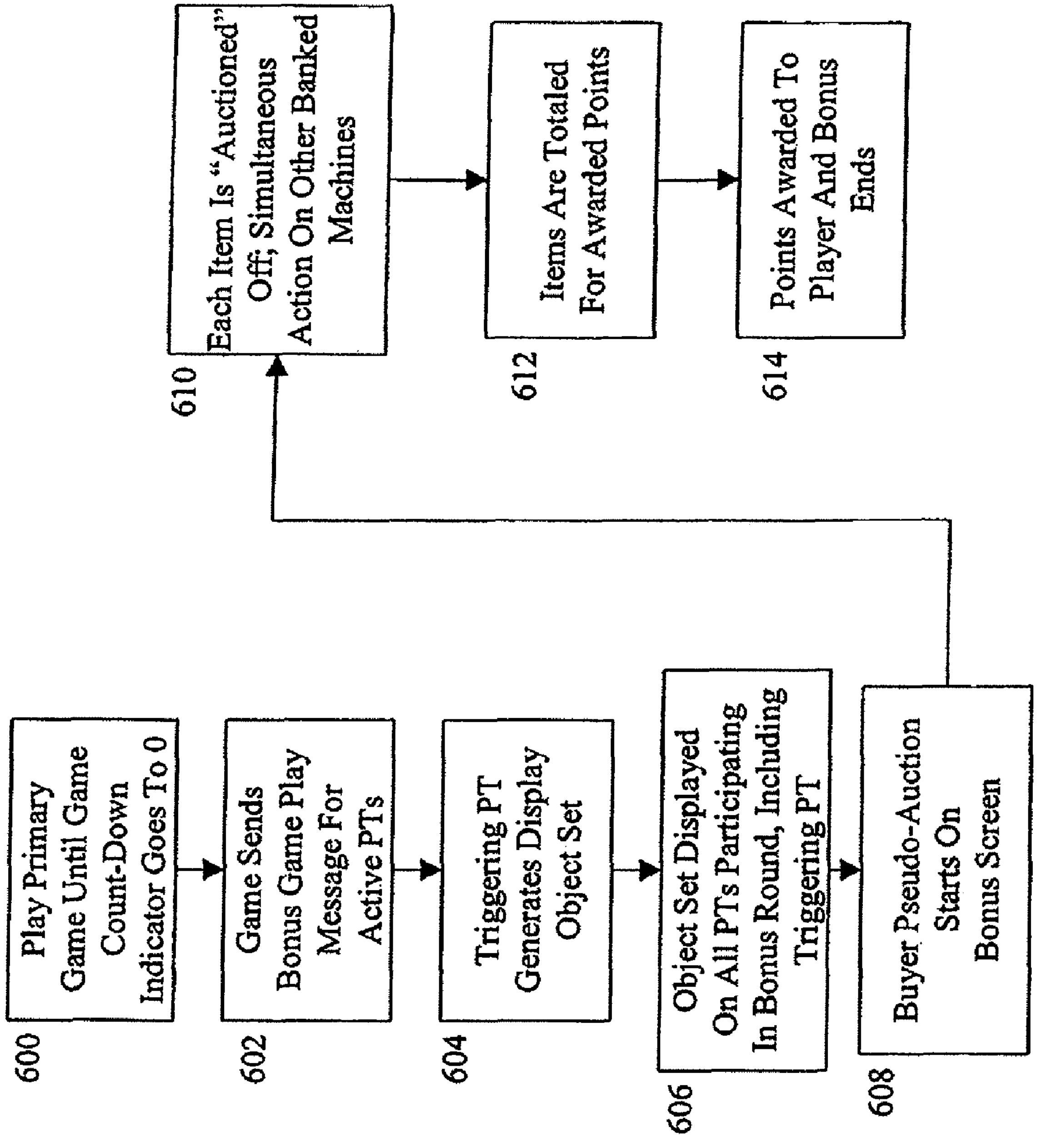
FIG. 6 is a flow diagram of a pseudo-auction game when the bonus round is triggered by a non-primary-game event in accordance with the present invention.

FIG. 6 illustrates the invocation of the auction bonus game without a bonus game trigger event occurring on the primary game. This was added to a preferred embodiment of the present invention in order to insure that the auction bonus game would be invoked at a desired frequency. Part of the design criteria for the present invention was to insure a considerable amount of player participation in the auction bonus games. Due to the random nature of the primary game, it is possible that the bonus game would not invoked for extended periods of time and an extended number of primary game plays. To counter this aspect of randomness, a counter is added in each PT. The counter is reset if the PT is involved in a bonus round. The counter is either rolled down (decremented) to 0 after being initialized to a specified value, incremented and compared to a maximum, or any similar method, such that after some number of primary game plays without participating in a bonus round, the auction bonus round will be invoked.

In one preferred embodiment, the counter is set to a positive value that also adds in a randomized variance so the invocation of the bonus due to the counter will not be detectable by players. In addition, this embodiment keeps track of "buyer's bonus rounds" (where the PT is a participating PT and not the PT that originated the bonus round) rather than all bonus rounds. The counter is set to the value NB (next buyer's bonus) as follows:

Using the PT's random number generator, calculate a whole number NB where

V=Variance

B=Base number to use as the average $$NB=B+V-\text{Random}(V*2)$$

NB is decremented each time a primary game play occurs until the PT is involved in a buyer's bonus round; if that occurs, NB is recalculated and the counter reset to the newly generated number. If NB reaches 0, then a unique form of the auction bonus game is invoked. In this bonus round, there is no PT which invoked the auction game because of triggering events in the primary game. To avoid confusing players, there will be no "sellers" when this happens (no bonus game screens as exemplified in FIG. 4 above, may be any sequence that specifically excludes actions unique to the PT that triggers the bonus auction game through primary game play), only "buyers" (the game sequence exemplified in FIG. 5 above, or any other sequence that includes the actions used by PTs that participate in an auction bonus play but do not trigger the bonus play).

Box 600 corresponds to players playing the primary game on a PT having the bonus game of the present invention until the NB counter reaches 0. Upon reaching 0, box 600 is left for box 602. The actions corresponding to box 602 include many that are taken when the auction bonus game is invoked through the primary game; however in this case the actions are invisible to the player. The PT sends out a message for eligible active (participating) PTs, which then invokes those PTs to start their actions similar to those described in FIG. 5.

Box 604 corresponds to the actions needed to generate the selected items list; in this case, the selected items list is generated entirely in the auction bonus game software and is invisible to the player. In a sense, the PT is acting like an invisible seller. The PT further generates all the other information usually provided by the PT which triggered the auction bonus game, including the bonus level, invisibly to the player. This information is communicated to the participating PTs and is also used by itself for its own "buyer's" bonus game to be displayed to the player.

Continuing on to box 606, the generated items list is used to display the auction bonus game sequence items on both the PT that started the bonus game using a counter, and all participating PTs. All PTs will be displaying the "buyer's" version of the auction bonus game. Box 606 is left for box 608, which corresponds to the actions taken to run the simulated buyer's auction game on each PT, including the PT which caused the bonus round to be entered. Actions include the interactive bidding of selected items. Box 610 corresponds to the simultaneous running of the buyer's themed auction bonus game on participating PTs and the PT whose counter ran down. After the buyer's themed auction bonus game ends the simulated bidding portion, box 612 is entered and the items "won" are given a game credit value and totaled for the player. Box 614 corresponds to the crediting of the bonus round points to the player by adding the game credits to the game credit meters (note: winnings may be dispersed any way including the issuance of tickets or vouchers; crediting game meters is used as an example of the most typical method of awarding the amount won by the player), and returning to primary game play.

What is claimed is:

1. A method for presenting a bonus game to one or more gaming devices in a network of gaming devices, the method comprising:

presenting a primary game on a first gaming device after receiving a wager on the first gaming device;

detecting a triggering event on the first gaming device triggering a first bonus game, wherein the first bonus game is a simulated auction game and the first gaming device is designated as an auctioneer;

transmitting a message to at least one second gaming device in the network in response to the triggering event to initiate a second bonus game if the second gaming device is active, wherein the second bonus game is a simulated auction game and the second gaming device is designated as a bidder;

receiving a response from the second gaming device to initiate the second bonus game;

presenting at least one first object on the first gaming device;

selecting at least one first object for presenting on the second gaming device;

presenting the selected first object on the second gaming device;

coordinating a start of the first bonus game on the first gaming device and the second bonus game on the second gaming device, wherein the at least one first object is auctioned during the first and second bonus games, and wherein the first gaming device manages the first bonus game on the first gaming device and does not interact with the second gaming device during the first bonus game, and the second gaming device manages the second bonus game on the second gaming device and does not interact with any other gaming device during the second bonus game; and awarding a first and second bonus prize at the end of the first and second bonus games on the first and second gaming devices, respectively.

2. The method of claim 1, further comprising funding a bonus progressive pool associated with the first gaming device with a portion of the wager placed on the first gaming device.

3. The method of claim 1, further comprising funding one or more bonus progressive pools on each gaming device with a portion of the wager received on each gaming device.

4. The method of claim 3, further comprising transferring funds between one or more bonus progressive pools from different gaming devices to balance the funds in each bonus progressive pool.

5. The method of claim 1, wherein the triggering event is a predetermined game outcome or a predetermined number of games played on a gaming device.

6. The method of claim 1, wherein the first and second bonus games are simulated auction games, wherein the first gaming device is designated as the auctioneer and the second gaming device is designated as a bidder, the auction comprises a plurality of objects to be auctioned, and the first object is one of the plurality of objects to be auctioned.

7. The method of claim 1, wherein the first bonus game presented on the first gaming device and the second bonus game presented on the second gaming device are different.

8. A method for presenting a bonus game to one or more gaming devices in a network of gaming devices, the method comprising:

receiving a wager on a first gaming device;

funding a bonus progressive pool with a portion of the wager;

sending a message to at least one second gaming device in the network to initiate a second bonus game in response to a first bonus game being initiated on the first gaming device as a result of a triggering event occurring on the first gaming device, wherein the first and second bonus games are simulated auction games, wherein the first gaming device is designated as an auctioneer and the second gaming device is designated as a bidder, and wherein the triggering event is a predetermined game outcome or a predetermined number of games played on the first gaming device;

receiving a response from the second gaming device to initiate the second bonus game;

presenting at least one first object on the first gaming device;

selecting at least one first object for presenting on the second gaming device;

presenting the selected first object on the second gaming device, wherein the selected first object is to be auctioned during the first and second bonus games;

coordinating a start of the first bonus game on the first gaming device and the second bonus game on the second gaming device;

presenting the first bonus game on the first gaming device and a second bonus game on the second gaming device; and dispensing a first bonus award at the end of the first bonus game on the first gaming device and a second bonus award at the end of the second bonus game on the second gaming device.

9. The method of claim 8, wherein the bonus progressive pool is dedicated to the first gaming device.

10. The method of claim 8, wherein the bonus progressive pool is a common pool that is shared between a plurality of networked gaming devices.

11. The method of claim 8, further comprising transferring funds between one or more bonus progressive pools from different gaming devices to balance the funds in each bonus progressive pool.

12. The method of claim 8, wherein the first bonus game is a simulated auction game, wherein the first gaming device is designated as the auctioneer and the second gaming devices is designated as a bidder.

13. The method of claim 8, wherein the first bonus game and the second bonus game are different.

* * * * *